United States Patent [19]

Arnout et al.

[11] Patent Number: 4,821,963
[45] Date of Patent: Apr. 18, 1989

[54] STEELWORKS CUTTING NOZZLE WITH A DOUBLE HEATING RING

[75] Inventors: Michel Arnout, Franconville; Patrick Fonteneau, Eaubonne; Didier Lasnier, Cergy, all of France

[73] Assignee: L'Air Liquide, Paris, France

[21] Appl. No.: 79,494

[22] Filed: Jul. 30, 1987

[30] Foreign Application Priority Data

Jul. 30, 1986 [FR] France ................. 86 11008

[51] Int. Cl.$^4$ .......................................... F23D 13/32
[52] U.S. Cl. .................. 239/419.3; 239/422; 239/423; 239/428
[58] Field of Search .............. 239/419.3, 422, 423, 239/427.3, 428, 418; 228/57

[56] References Cited

U.S. PATENT DOCUMENTS

| 3,364,970 | 1/1968 | Dombruch et al. | 239/422 |
| 3,389,861 | 6/1968 | Nakanishi et al. | 239/422 |
| 4,173,499 | 11/1979 | Holemann | 239/422 |
| 4,363,443 | 12/1982 | Huehne | 239/419.3 |
| 4,383,648 | 5/1983 | Lunquist et al. | 239/419.3 |

FOREIGN PATENT DOCUMENTS

| 103651 | 3/1984 | European Pat. Off. |
| 2832323 | 2/1980 | Fed. Rep. of Germany. |
| 506186 | 8/1920 | France. |
| 949518 | 9/1949 | France. |
| 950991 | 3/1964 | United Kingdom. |
| 2109533 | 6/1983 | United Kingdom ............... 239/423 |

Primary Examiner—Andres Kashnikow
Assistant Examiner—Christopher G. Trainor
Attorney, Agent, or Firm—Lee C. Robinson, Jr.

[57] ABSTRACT

The nozzle comprises an oxidizing outer heating ring and a carburizing inner heating ring surrounding the cutting jet. This nozzle is made in two parts respectively forming a unit (1) opf injectors and a cutting unit (2) in adjoining relation to each other in a transverse joint plane and in which are provided various passageways (4, 5). Grooves (7) are provided for putting the outer passageways (5) in communication with the inner passageways (4) so as to supply to the inner passageways (4) the required small quantity of oxygen for the inner heating ring from the oxy-fuel mixture supplied to the outer passageways (5).

6 Claims, 1 Drawing Sheet

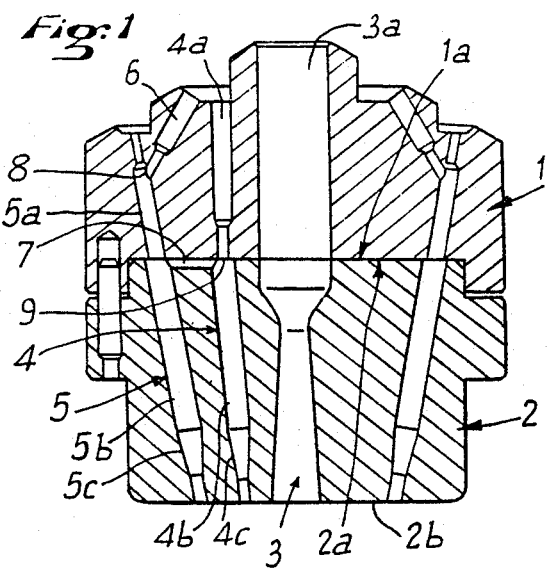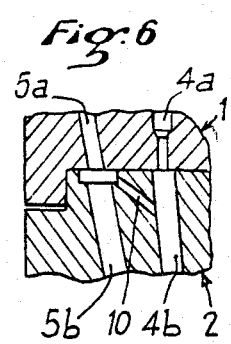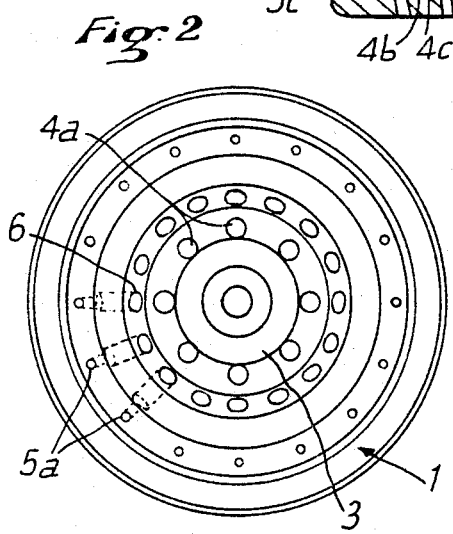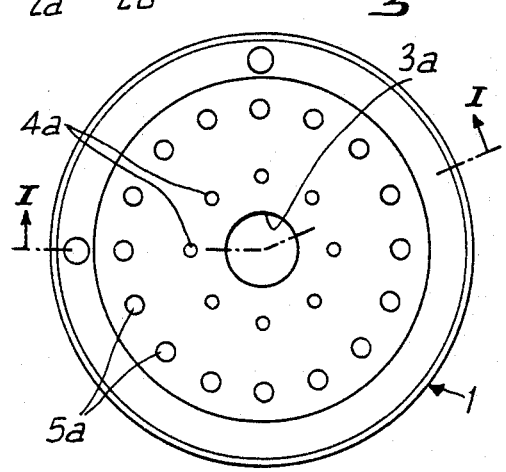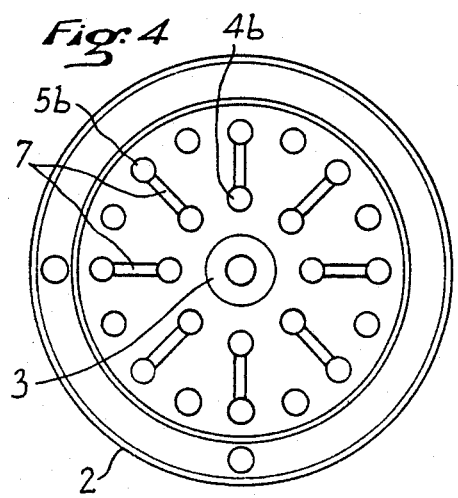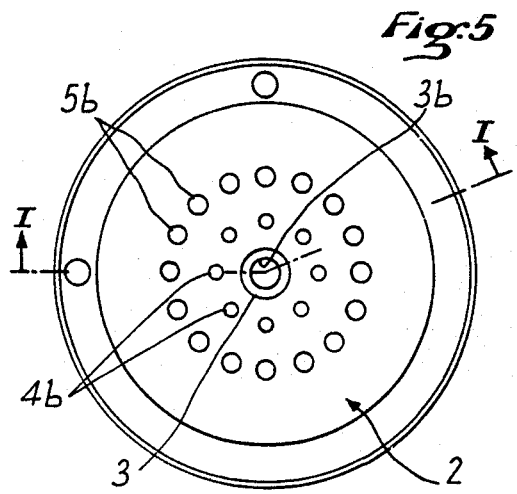

STEELWORKS CUTTING NOZZLE WITH A DOUBLE HEATING RING

The present invention relates to a steelworks cutting nozzle with a double heating ring.

Cutting nozzles are used at the present time in steelworks for hot oxygen-cutting of sheets of great thicknesses or for cold splitting. These known nozzles are usually of the single-piece type made entirely from copper. These nozzles are arranged to ensure, inside the nozzle, a mixture of heating gases, the fuel gases employed most often for this purpose being natural gas and propane.

The oxygen-cutting of thick sheets in the hot or cold state requires great heating powers and this heating must be more intense in the hot state than in the cold state. To achieve suitable oxygen-cutting performances on great thicknesses, it is necessary to effectively heat not only the top of the oxygen-cut work piece but also the bottom of the oxygen-cut cuts or kerfs. This is the reason why the technology most commonly employed at the present time in the design of cutting nozzles for great thicknesses, is the double heating ring. This double ring is formed by an outer ring having a very oxidizing flame permitting the heating of the top of the work piece to be oxygen-cut, and an inner heating ring close to the cutting jet and employing a very carburizing flame so as to obtain a long feather around the cutting jet which, when entrained by the latter, penetrates into the cutting kerf and assists in the heating of the bottom of this kerf.

The two rings of flame, namely the oxidizing outer ring and the carburizing inner ring, are obtained by adapted ratios of sections in the injectors which are formed in the cutting nozzle.

Bearing in mind the low specific heating power of presently-used gases (natural gas and propane), the rates of flow of fuel gas and heating oxygen are very large (15 to 20 cu.m/h) and the practical realization of the injectors by machining does not present any particular difficulty. Indeed, the diameter of the orifices in the region of the injectors is between 0.6 and 1.2 mm and even more.

The use of other gases, such as crylene, which affords a distinctly greater specific heating power close to that of acetylene and requires higher outlet velocities than natural gas or propane, results, in adopting the same preceding technology and optimizing the heating flows, in the need to provide orifices of very small diameter in the injectors. These orifices must indeed have a diameter on the order of 0.2 to 0.3 mm at the inlet of the heating oxygen leading to the central fuel ring for supplying to the latter only a very small quantity of oxygen.

The drilling of orifices of such small diameters in a part of copper obviously presents considerable difficulties. To overcome this, it has already been proposed, for forming the injectors, to position inserts in previously-drilled orifices of relatively large diameter. However, such a solution is delicate to carry out and expensive.

An object of the present invention is to overcome these drawbacks by providing a cutting nozzle of particularly simple design, easy to machine and having, in the region of the injectors, orifices of very small cross-sectional size.

For this purpose, this steelworks cutting nozzle comprises a double heating ring, namely an oxidizing outer heating ring and a carburizing inner heating ring surrounding the cutting jet, and a central cutting passageway producing the cutting jet. The arrangements of passageways are spaced apart around the axis of the nozzle, namely a first arrangement of outer passageways producing the oxidizing outer heating ring and a second arrangement of inner passageways producing the carburizing inner heating ring. The nozzle is characterized in that it is constituted by two parts respectively forming an injector unit and a cutting unit. These parts are assembled in a transverse joint plane and contain the various passageways. Means are provided to connect the outer passageways and the inner passageways so as to supply to the inner passageways the small quantity of oxygen necessary for the inner heating ring from the oxy-fuel mixture fed to the outer passageways.

According to a further feature of the invention, the injectors feeding the inner heating ring are formed by the assembly of the two units constituting the nozzle. These injectors are located, in the transverse joint plane of the two units. A fuel gas supply conduit is drilled in the injector unit, and an oxy-fuel mixture supply groove is formed in the front side of the cutting unit and extends between a conduit of the inner passageway and a conduit of the outer passageway of said cutting unit.

The nozzle according to the invention is advantageous in that the injectors supplying oxygen to the inner heating ring, may have a relatively large diameter owing to the fact that, in order to obtain a given quantity of oxygen in the inner passageways of the cutting unit, it is necessary to pass through a larger volume of oxy-fuel mixture and that, moreover, the pressure in the chambers containing the oxy-fuel mixture of the outer ring is lower than the heating oxygen supply pressure.

The nozzle according to the invention also affords the advantage that its construction in two parts enables the user to merely change the cutting unit in the event of an incident resulting in the deterioration of the visible part of the nozzle, whereas at the present time the whole of the nozzle has to be changed.

A further advantage afforded by the nozzle according to the invention in two parts is that the heating passageways formed in the cutting unit may be realized with convergent outlet parts, which permits an optimization of the outlet velocities of the gases while retaining sufficiently small mixing chambers to guarantee a good homogenization of these gases.

An embodiment of the present invention will be described hereinafter by way of a non-limiting example with reference to the accompanying drawing, in which:

FIG. 1 is an axial sectional view, taken on line I—I of FIG. 3, of a steelworks cutting nozzle with a double heating ring according to the invention;

FIG. 2 is a plan view of the injector unit of the cutting nozzle of FIG. 1;

FIG. 3 is a view of the bottom side of the injector unit of the cutting nozzle of FIG. 1;

FIG. 4 is a plan view of the cutting unit of the nozzle of FIG. 1;

FIG. 5 is a view of the bottom side of the cutting unit of the cutting nozzle of FIG. 1, and FIG. 6 is a partial sectional view of a variant.

The steelworks cutting nozzle represented in FIGS. 1 to 5 is constituted by two parts fixed together by screws or pins, namely an upper unit 1 of injectors and a lower cutting unit 2. These two units 1 and 2 have a generally cylindrical shape and are in adjoining relation to each other on their respective end sides 1a and 2a constituting their joint plane.

The cutting nozzle has, in its central part, an axial cutting passageway 3 formed in the two units 1 and 2. This cutting passageway 3 is constituted by a cylindrical conduit 3a drilled axially in the injector unit 1 and a convergent-divergent conduit 3b drilled axially in the cutting unit 2 so as to constitute an ejection nozzle for the cutting jet.

The cutting passageway 3 is surrounded by an arrangement of inner passageways 4 evenly spaced apart around the axis of the nozzle and adapted to produce, at the outlet of the nozzle, a carburizing inner heating ring surrounding the cutting jet. Each inner passageway 4 is constituted by two conduits 4a and 4b which are interconnected in the joint plane and are respectively drilled in the two units 1 and 2. The conduit 4a extends longitudinally in the injector unit 1 and it opens, at its upper end, into a fuel gas supply chamber and, at its lower end, onto the lower end side 1a of the injector unit 1. The conduit 4b, which is drilled throughout the cutting unit 2, is convergent in the direction of the axis of the nozzle and opens, at its upper end, onto the end side 2a of the cutting unit 2 in facing relation to the end of the conduit 4a, and, at its lower end, onto the lower end side 2b of the cutting unit 2. The conduit 4b includes a convergent part 4c close to its outlet orifice.

The cutting nozzle further comprises a second arrangement of outer passageways 5 evenly spaced apart around the axis of the nozzle and adapted to produce an oxidizing outer heating ring around the carburizing inner heating ring. A larger number of outer passageways, are provided than inner passageways and their number is for example double that of the inner passageways, each outer passageway 5 being constituted by two conduits 5a, 5b respectively drilled throughout the two units 1 and 2. The two conduits 5a and 5b are in alignment on the same axis and form a passageway 5 which is convergent toward the axis of the nozzle. The conduit 5a drilled in the injector unit 1 opens, at its upper end, onto a heating oxygen supply chamber, and, at its lower end, onto the lower end side 1a of the unit 1. The conduit 5a also communicates, through a conduit 6, with the fuel gas supply chamber. The conduit 5b opens, at its upper end, onto the upper end side 2a of the cutting unit 2 and, at its lower end, onto the lower end side 2b of this unit. This conduit 5b has advantageously a convergent part 5c close to its outlet orifice.

As can be seen more particularly in FIG. 4, the upper ends of the inner conduits 4b communicate with the upper ends of the outer conduits 5b which are radially in alignment therewith through radial grooves 7 provided in the upper end side 2a of the cutting unit 2.

In a variant shown in FIG. 6, an inner conduit 4b and an outer conduit 5b could be put into communication with each other by means of an oblique conduit 10 drilled between the upper orifice of the outer conduit 5b and the inner conduit 4b.

It can be seen from the foregoing description that the injector unit 1 comprises an arrangement of injectors 8 for forming an oxy-fuel mixture adapted to create the outer heating ring. Each injector 8 is located at the junction point of the conduits 5a and 6. Further, the nozzle further comprises an arrangement of injectors 9 supplying an oxy-fuel mixture to the inner heating ring. Each injector 9 is formed at the upper end of a conduit 4b in the region where a radial groove 7 supplying an oxy-fuel mixture is connected and where the lower orifice of the conduit 4a supplying fuel is located.

Consequently, the arrangement of inner passageways 4 produces, around the cutting jet issuing from the nozzle 3b, a carburizing inner heating ring, the small quantity of oxygen required for forming this ring being taken, through the grooves 7, from the oxy-fuel mixture formed in the outer passageways 5. These outer passageways in turn produce the oxidizing outer heating ring.

The convergent parts 4c, 5c of the conduits 4b, 5b optimize the outlet velocities of the gases. The mixture chambers, constituted by the upstream parts of these conduits 4b, 5b, are sufficiently large to guarantee a good homogenization of the gases.

What is claimed is:

1. A steelworks cutting nozzle providing a cutting jet and double heating rings, namely an oxidizing outer heating ring for receiving oxygen and a carburizing inner heating ring for receiving fuel, said rings surrounding the cutting jet, said nozzle having a longitudinal axis and comprising two parts respectively forming a unit of injectors and a cutting unit in adjoining relation to each other in a transverse joint plane, said units defining a central cutting passageway for producing said cutting jet and, disposed around said central cutting passageway, two arrangements of passageways spaced apart around said axis of the nozzle, namely a first arrangement of outer passageways for producing said oxidizing outer heating ring and a second arrangement of inner passageways for producing said carburizing inner heating ring the nozzle further comprising fuel gas supply conduits in the injector unit for supplying fuel to the outer passageways, and means for establishing communication between the outer passageways and the inner passageways so as to supply to the inner passageways a small quantity of oxygen from the outer passageways by way of an oxy-fuel mixture supply groove.

2. A steelworks cutting nozzle according to claim 1, wherein the inner passageways and the outer passageways each comprise a conduit in the injector unit and a conduit in the cutting unit, the conduits of each passageway communicating with each other and the units having adjoining ends in the joint plane, and wherein the oxy-fuel mixture supply groove is formed in the transverse joint plane of the two units, in an assembled state of the units.

3. A steelworks cutting nozzle according to claim 2, wherein the groove extends radially in said cutting unit between an end of the outer passageway conduit and an end of the inner passageway conduit.

4. A steelworks cutting nozzle according to claim 1, wherein the nozzle defines an oblique conduit extending between an outer passageway and an inner passageway.

5. A steelworks cutting nozzle according to claim 1, wherein the inner and outer passageways in the cutting unit have respective convergent parts close to the outlet ends thereof.

6. A cutting nozzle having a longitudinal axis, the nozzle comprising, in combination:
two separate parts respectively forming a unit of injectors and a cutting unit in adjoining relation to each other in a joint plane transverse to said longitudinal axis, said units defining:
a central cutting passageway disposed along said longitudinal axis for producing a cutting jet;

a first arrangement of outer oxidizer heating passageways spaced apart around said cutting passageways;

a second arrangement of inner carburizing heating passageways, the number of said outer passageways being substantially greater than the number of said inner passageways;

means for supplying oxygen to the outer passageways; and means for supplying fuel to the inner passageways;

said injector unit defining a plurality of fuel conduits, one for each of the outer passageways, for supplying fuel thereto, each of said fuel conduits being disposed at an acute angle with respect to said longitudinal axis;

said cutting unit defining a plurality of oxy-fuel supply grooves, one for each of said inner passageways, for supplying oxygen and fuel thereto, each of said oxy-fuel supply grooves being located in said joint plane transverse to said longitudinal axis and extending from an outer passageway to an inner passageway.

* * * * *